(12) United States Patent
Kim et al.

(10) Patent No.: US 11,876,159 B2
(45) Date of Patent: Jan. 16, 2024

(54) ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Seung Kim, Daejeon (KR); Chul Haeng Lee, Daejeon (KR); Jeong Woo Oh, Daejeon (KR)

(73) Assignee: LG Energy Solution, Ltd. (KR)

( * ) Notice: Subject to any disclaimer, the term of this patent is extended or adjusted under 35 U.S.C. 154(b) by 285 days.

(21) Appl. No.: 17/599,678

(22) PCT Filed: Apr. 1, 2020

(86) PCT No.: PCT/KR2020/004470
§ 371 (c)(1),
(2) Date: Sep. 29, 2021

(87) PCT Pub. No.: WO2020/204607
PCT Pub. Date: Oct. 8, 2020

(65) Prior Publication Data
US 2022/0216516 A1    Jul. 7, 2022

(30) Foreign Application Priority Data

Apr. 3, 2019 (KR) .................. 10-2019-0039269

(51) Int. Cl.
*H01M 10/0567* (2010.01)
*C07F 5/02* (2006.01)
(Continued)

(52) U.S. Cl.
CPC ......... *H01M 10/0567* (2013.01); *C07F 5/022* (2013.01); *H01M 4/0407* (2013.01);
(Continued)

(58) Field of Classification Search
CPC ........... H01M 10/056; H01M 10/0567; H01M 10/0525; H01M 10/0569
See application file for complete search history.

(56) References Cited

U.S. PATENT DOCUMENTS 6,045,948 A    4/2000   Wang et al.
9,126,914 B1   9/2015   Zaragoza Doerwald et al.
(Continued)

FOREIGN PATENT DOCUMENTS

CN    103283075 A    9/2013
CN    104220408 A    12/2014
(Continued)

OTHER PUBLICATIONS

Extended European Search Report for Application No. 20782020.0 dated Apr. 4, 2022, pp. 1-5.
(Continued)

*Primary Examiner* — Nathanael T Zemui
(74) *Attorney, Agent, or Firm* — Lerner David LLP

(57) ABSTRACT

An electrolyte and a lithium secondary battery including the same are disclosed herein. In some embodiments, an electrolyte includes a lithium salt, an organic solvent, and an additive, wherein the additive includes a compound represented by Formula 1. In some embodiments, a lithium secondary battery includes a positive electrode, a negative electrode, and the electrolyte.

10 Claims, 3 Drawing Sheets

(51) Int. Cl.
    *H01M 4/04*      (2006.01)
    *H01M 10/0525*   (2010.01)
    *H01M 10/0569*   (2010.01)

(52) U.S. Cl.
    CPC ... *H01M 10/0525* (2013.01); *H01M 10/0569* (2013.01); *H01M 2300/0028* (2013.01)

(56) References Cited

U.S. PATENT DOCUMENTS

| | | |
|---|---|---|
| 2006/0216612 A1 | 9/2006 | Jambunathan et al. |
| 2013/0273436 A1 | 10/2013 | Shinmei et al. |
| 2015/0239816 A1 | 8/2015 | Zaragoza Doerwald et al. |
| 2016/0118688 A1 | 4/2016 | Nakanishi |
| 2018/0006329 A1 | 1/2018 | Xiao et al. |
| 2019/0140321 A1 | 5/2019 | Ahn et al. |

FOREIGN PATENT DOCUMENTS

| | | |
|---|---|---|
| EP | 0903798 A1 | 3/1999 |
| JP | 2001250535 A | 9/2001 |
| JP | 2009023946 A | 2/2009 |
| JP | 2011124021 A | 6/2011 |
| JP | 2012169250 A | 9/2012 |
| JP | 2012209145 A | 10/2012 |
| JP | 2013008558 A | 1/2013 |
| JP | 2013098057 A | 5/2013 |
| JP | 2016085888 A | 5/2016 |
| JP | 2018156769 A | 10/2018 |
| KR | 100828532 B1 | 5/2008 |
| KR | 20140001693 A | 1/2014 |
| KR | 20140025320 A | 3/2014 |
| KR | 20150072533 A | 6/2015 |
| KR | 20170113601 A | 10/2017 |
| KR | 20170134258 A | 12/2017 |
| WO | 2013011158 A2 | 1/2013 |

OTHER PUBLICATIONS

International Search Report for Application No. PCT/KR2020/004470, dated Jul. 8, 2020, 3 pages.

ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/004470, filed on Apr. 1, 2020, which claims priority from Korean Patent Application No. 10-2019-0039269, filed on Apr. 3, 2019, the disclosures of which are incorporated by reference herein.

TECHNICAL FIELD

The present invention relates to an electrolyte for a lithium secondary battery which may improve life characteristics and resistance characteristics of the battery by including boron and sulfur in a film formed on an electrode, and a lithium secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

A technology based on secondary batteries is the most suitable technology for various applications, wherein, since a secondary battery may be miniaturized, it is applicable to a personal IT device, and it is also applicable to a large device such as a power storage device.

Among these secondary battery technologies, lithium secondary batteries, which are battery systems having the theoretically highest energy density per weight and volume, are in the spotlight.

The lithium secondary battery is generally composed of a positive electrode formed of a transition metal oxide containing lithium, a negative electrode capable of storing lithium, an electrolyte that becomes a medium for transferring lithium ions, and a separator, and, among them, a significant amount of research on the electrolyte has been conducted while the electrolyte is known as a component that greatly affects stability and safety of the battery.

In general, it is desirable to use a mixture of an organic solvent and a lithium salt having high thermal and chemical stability as well as maintaining electrochemical stability in an operating voltage range as the electrolyte. However, since a reduction voltage of the organic solvent is typically higher than an operating voltage of the negative electrode such as graphite/silicon, a reduction decomposition reaction may occur and an oxidation decomposition reaction may occur on a surface of the positive electrode. Thus, the control of these decomposition reactions is an important factor in improving battery performance.

Organic/inorganic decomposition products are generated on surfaces of the positive/negative electrodes by these decomposition reactions to form films, wherein the film is called a solid-electrolyte interphase (SEI) when it is formed on the surface of the negative electrode, and the film is called a passivation film when it is formed on the positive electrode.

The film formed on the surface of the electrode may move lithium ions while suppressing an additional decomposition reaction of the electrolyte. Recently, there is a trend to add various additives to the electrolyte to form a better film than a case where the lithium salt and the organic solvent are only used as the electrolyte.

Particularly, since life characteristics and resistance characteristics of the battery are largely dependent on characteristics of the film formed on the surface of the electrode, there is an urgent need for research into an electrolyte to form a more robust film having better electrical properties during a charge reaction.

(Prior Art Document) Korean Patent Application Laid-open Publication No. 10-2017-0134258

Technical Problem

An aspect of the present invention provides an electrolyte for a lithium secondary battery which may improve life characteristics and resistance characteristics of the battery by including boron and sulfur in a film formed on an electrode during a charge and discharge process of the battery, and a lithium secondary battery including the same.

Technical Solution

According to an aspect of the present invention, there is provided an electrolyte for a lithium secondary battery which includes: a lithium salt, an organic solvent, and an additive, wherein the additive includes a compound represented by Formula 1.

[Formula 1]

In Formula 1, $R_1$ and $R_2$ are each independently an alkyl group having 1 to 3 carbon atoms.

According to another aspect of the present invention, there is provided a lithium secondary battery including a positive electrode, a negative electrode, and the electrolyte for a lithium secondary battery.

A film containing boron and sulfur may be formed on a surface of at least one electrode selected from the group consisting of the positive electrode and the negative electrode.

Advantageous Effects

If an electrolyte for a lithium secondary battery according to the present invention is used, a film containing boron (B) and sulfur (S) may be formed on a surface of an electrode by a decomposition reaction of the electrolyte occurring during charge and discharge of the battery. The film containing boron and sulfur may provide an excellent lithium secondary battery having improved life characteristics and resistance characteristics by effectively suppressing an additional decomposition reaction of the electrolyte.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and there

MODE FOR CARRYING OUT THE INVENTION

Figure 1:
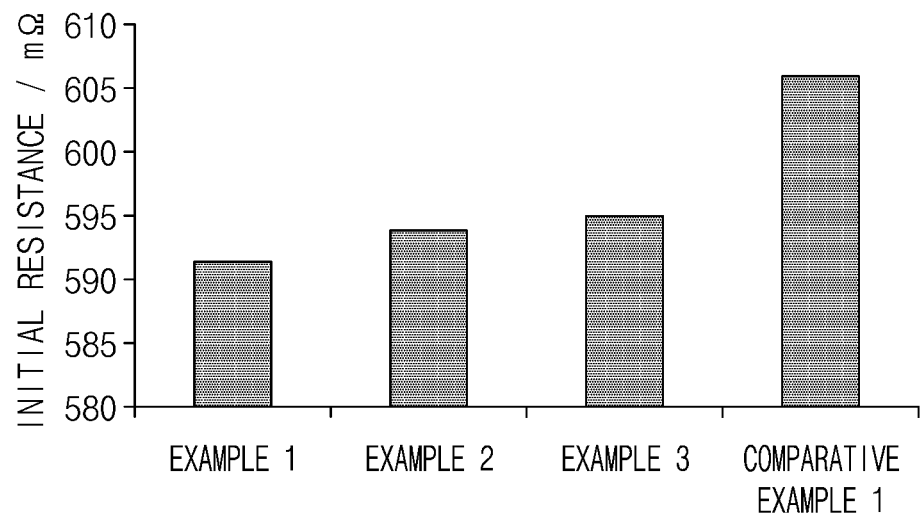
- FIG. 1 is a graph illustrating initial resistances measured according to Experimental Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

<Electrolyte for Lithium Secondary Battery>

An electrolyte for a lithium secondary battery according to the present invention includes a lithium salt, an organic solvent, and an additive, wherein the additive includes a compound represented by the following Formula 1.

[Formula 1]

In Formula 1, $R_1$ and $R_2$ are each independently an alkyl group having 1 to 3 carbon atoms.

(1) Lithium Salt

The lithium salt is used to improve lithium ion yield (Li+ transfer number) and degree of dissociation of lithium ions by sufficiently supplying the lithium ions.

Specifically, a compound capable of providing lithium ions and used in a lithium secondary battery may be used as the lithium salt without particular limitation. Specifically, the lithium salt may include $Li^+$ as a cation, and one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $CF_3$ $(CF_2)_7SO_3^-$, $CF_3CO_2^-$, $CH_3CO_2^-$, $SCN^-$, and $(CF_3CF_2SO_2)_2N^-$ or, if necessary, a mixture of two or more thereof may be used as an anion.

The lithium salt may be appropriately changed in a normally usable range, but may be included in a concentration of 0.8 M to 3.0 M, for example, 1.0 M to 3.0 M in an electrolyte solution to obtain an optimum effect of forming a film for preventing corrosion of a surface of an electrode.

If the concentration of the lithium salt is less than 0.8 M, since mobility of lithium ions is reduced, capacity characteristics may be degraded. If the concentration of the lithium salt is greater than 3.0 M, since viscosity of a non-aqueous electrolyte solution is excessively increased, impregnability of the electrolyte may be reduced and a film-forming effect may be reduced.

(2) Organic Solvent

Various organic solvents typically used in an electrolyte for a lithium secondary battery may be used as the organic solvent without limitation. For example, the organic solvent may include a cyclic carbonate-based organic solvent, a linear carbonate-based organic solvent, or a mixed organic solvent thereof.

Specific examples of the cyclic carbonate-based organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, difluoroethylene carbonate (DFEC), and fluoroethylene carbonate (FEC), or a mixture of two or more thereof.

Also, specific examples of the linear carbonate-based organic solvent may be any one selected from the group consisting of dimethyl carbonate (DMC), diethyl carbonate (DEC), dipropyl carbonate, ethyl methyl carbonate (EMC), methylpropyl carbonate, and ethylpropyl carbonate, or a mixture of two or more thereof.

Furthermore, an ether organic solvent, an ester organic solvent, or an amide organic solvent may be further mixed and used as the organic solvent, if necessary.

Also, the ether organic solvent may include any one selected from the group consisting of dimethyl ether, diethyl ether, dipropyl ether, methylethyl ether, methylpropyl ether, and ethylpropyl ether, or a mixture of two or more thereof, but the present invention is not limited thereto.

The ester organic solvent may include any one selected from the group consisting of a linear ester such as methyl acetate, ethyl acetate, propyl acetate, methyl propionate, ethyl propionate, propyl propionate, and butyl propionate; and a cyclic ester such as γ-butyrolactone, γ-valerolactone, γ-caprolactone, σ-valerolactone, and ε-caprolactone, or a mixture of two or more thereof, but the present invention is not limited thereto.

(3) Additive

The electrolyte for a lithium secondary battery according to the present invention may include a compound represented by the following Formula 1 as an additive.

[Formula 1]

In Formula 1, $R_1$ and $R_2$ are each independently an alkyl group having 1 to 3 carbon atoms.

A decomposition reaction of the electrolyte occurs on a surface of an electrode during a charge and discharge process of the battery, wherein, since a reduction decomposition product of the electrolyte forms a film on the surface of the electrode to suppress the movement of electrons required for a reaction between the electrode and the electrolyte, an additional decomposition reaction of the electrolyte is suppressed. In general, the film formed on a negative electrode is defined as a solid-electrolyte interphase (SEI), and the film formed on a positive electrode is defined as a passivation film. In this case, a type of the decomposition reaction product of the electrolyte varies depending on a type of the additive added to the electrolyte, and components of the film formed accordingly may also vary.

The compound represented by Formula 1, which is included as the electrolyte additive, may form a film containing boron and sulfur on the electrode by the decomposition reaction of the electrolyte during charge and discharge of the battery. Thus, if the film containing boron and sulfur is formed on the electrode, since passivation ability is improved in comparison to a film formed when an electrolyte composed of only the organic solvent and the lithium salt is used, life characteristics and resistance characteristics of the battery may be improved.

Also, while the compound represented by Formula 1 and/or components (e.g., organic solvent component) included in the electrolyte are decomposed together, decomposition products may be combined with each other to form a polymer, and the polymer may be included in the film. As a result, a more stable and robust film may be formed.

The alkyl group ($R_1$ and/or $R_2$) substituted into a sulfur atom (S) of the compound of Formula 1 is a factor affecting a size of the polymer included in the film, wherein the resistance characteristics may be further improved when the alkyl group has 1 to 3 carbon atoms.

As a specific example, in Formula 1, $R_1$ and $R_2$ may each independently be selected from the group consisting of —$CH_3$, —$C_2H_5$, —$C_3H_7$, and —$CH(CH_3)_2$.

As a more specific example, the compound represented by Formula 1 may be selected from the group consisting of compounds represented by Formulae 1A to 1J below.

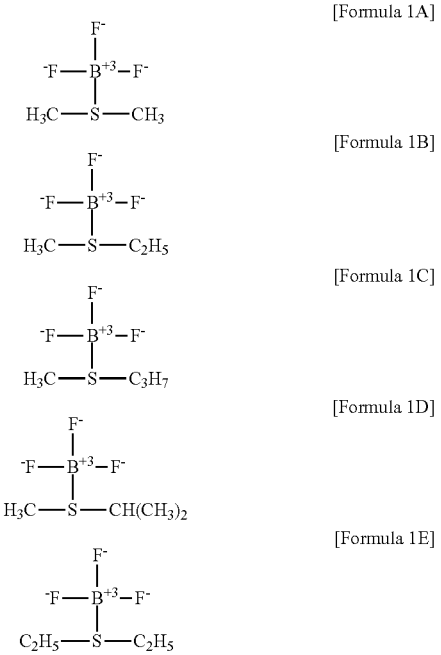

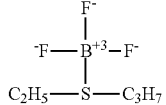

[Formula 1F]

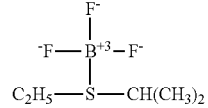

[Formula 1G]

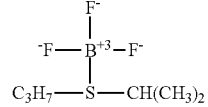

[Formula 1H]

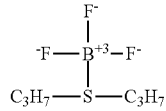

[Formula 1I]

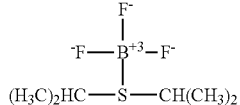

[Formula 1J]

The compound represented by Formula 1 may be included in an amount of 0.1 part by weight to 2 parts by weight, preferably 0.3 part by weight to 2 parts by weight, and more preferably 0.3 part by weight to 1 part by weight based on 100 parts by weight of the electrolyte for a lithium secondary battery. In a case in which the compound represented by Formula 1 is included in an amount greater than the above range, a side reaction with other compounds included in the electrolyte may be caused by a residue that does not participate in a film-forming reaction. Also, in a case in which the compound represented by Formula 1 is included in an amount less than the above range, since the boron and sulfur are not sufficiently included on the surface of the electrode, the life characteristics and resistance characteristics of the battery may not be significantly improved.

(4) Additional Additives

The electrolyte for a lithium secondary battery of the present invention may further include compounds, which may form a stable film on the surfaces of the negative electrode and positive electrode while not significantly increasing initial resistance, or which may act as a complementary agent for suppressing the decomposition of the solvent in the non-aqueous electrolyte solution and improving mobility of lithium ions, as additional additives.

The additional additives, for example, may further include at least one compound selected from the group consisting of a vinyl silane-based compound, a phosphate-based compound, a phosphite-based compound, a sulfite-based compound, a sulfone-based compound, a sulfate-based compound, a sultone-based compound, a halogen-substituted carbonate-based compound, a nitrile-based compound, a borate-based compound, and a lithium salt-based compound.

The vinyl silane-based compound may improve durability of the battery by forming a stable film through electrochemical reduction at the surface of the negative electrode. Specifically, tetravinylsilane may be included as the vinyl silane-based compound.

The phosphate-based compound or phosphite-based compound is a component for assisting the formation of the film by being electrochemically decomposed on the surfaces of the positive electrode and the negative electrode, wherein it may improve the life characteristics of the secondary battery. Specifically, the phosphate-based compound or phosphite-based compound may include at least one compound selected from the group consisting of lithium difluoro(bisoxalato)phosphate, lithium difluorophosphate, tetramethyl trimethylsilyl phosphate (TMSPa), trimethylsilyl phosphite (TMSPi), tris(2,2,2-trifluoroethyl) phosphate (TFEPa), and tris(trifluoroethyl) phosphite (TFEPi).

The sulfite-based compound may include at least one compound selected from the group consisting of ethylene sulfite, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite.

The sulfone-based compound may include at least one compound selected from the group consisting of divinyl sulfone, dimethyl sulfone, diethyl sulfone, methylethyl sulfone, and methylvinyl sulfone.

The sulfate-based compound may include at least one compound selected from the group consisting of ethylene sulfate (Esa), trimethylene sulfate (TMS), and methyl trimethylene sulfate (MTMS).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

As the halogen-substituted carbonate-based compound, fluoroethylene carbonate (FEC) may be included.

Also, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The borate-based compound may include lithium oxalyldifluoroborate.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$.

The additional additives may be included in an amount of 20 parts by weight or less, for example, 10 parts by weight or less based on 100 parts by weight of the electrolyte for a lithium secondary battery. If the amount of the additives is greater than the above range, a side reaction may excessively occur in the electrolyte during charge and discharge, and, since the additives are not sufficiently decomposed at high temperatures, the additives may be present in the form of an unreacted material or precipitates in the non-aqueous electrolyte solution, and, accordingly, the life or resistance characteristics of the secondary battery may be degraded.

<Lithium Secondary Battery>

Next, a lithium secondary battery according to the present invention will be described.

The lithium secondary battery according to an embodiment of the present invention includes a positive electrode, a negative electrode, and the electrolyte for a lithium secondary battery, and selectively includes a separator which may be disposed between the positive electrode and the negative electrode. In this case, since the electrolyte for a lithium secondary battery is the same as described above, a detailed description thereof will be omitted.

(1) Positive Electrode

The positive electrode may be prepared by coating a positive electrode collector with a positive electrode active material slurry including a positive electrode active material, a binder for an electrode, a conductive agent for an electrode, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In this case, the positive electrode collector may have fine surface roughness to improve bonding strength with the positive electrode active material, and the positive electrode collector may be used in various shapes such as a film, a sheet, a foil, a net, a porous body, a foam body, a non-woven fabric body, and the like.

The positive electrode active material is a compound capable of reversibly intercalating and deintercalating lithium, wherein the positive electrode active material may specifically include a lithium composite metal oxide including lithium and at least one metal such as cobalt, manganese, nickel, aluminum, or iron.

Specifically, the lithium composite metal oxide may include lithium-iron-based oxide having an olivine structure (as a specific example, $LiFePO_4$), lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$)), etc.), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{s1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiFePO_4$, $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.5}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

In the lithium composite metal oxide, at least one of the metallic elements excluding lithium may include at least one element selected from the group consisting of Al, copper (Cu), Fe, V, Cr, Ti, zirconium (Zr), zinc (Zn), Ta, niobium (Nb), Mg, boron (B), tungsten (W), and Mo. In a case in which the above-described element is further included in the lithium composite metal oxide, structural stability of the positive electrode active material is improved, and, as a result, output characteristics of the battery may be improved.

The binder for an electrode is a component that assists in the binding between the positive electrode active material and the conductive agent for an electrode and in the binding with the current collector. Specifically, the binder may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene terpolymer (EPDM), a sulfonated EPDM, a styrene-butadiene rubber, styrene-butadiene rubber-carboxymethylcellulose (SBR-CMC), a fluoro rubber, various copolymers, and the like.

The conductive agent for an electrode is a component for further improving the conductivity of the positive electrode active material. Any conductive agent for an electrode may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder for an electrode and the conductive agent for an electrode is included.

(2) Negative Electrode

Also, the negative electrode, for example, may be prepared by coating a negative electrode collector with a negative electrode active material slurry including a negative electrode active material, a binder for an electrode, a conductive agent for an electrode, and a solvent. A metal current collector itself may be used as the negative electrode.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), Zn, Mg, cadmium (Cd), cerium (Ce), nickel (Ni), or Fe; alloys composed of the metals (Me); oxides (MeOx) of the metals (Me); and composites of the metals (Me) and carbon.

Since the binder for an electrode, the conductive agent for an electrode, and the solvent are the same as described above, detailed descriptions thereof will be omitted.

In the lithium secondary battery according to the present invention, a film containing boron and sulfur may be formed on the surface of at least one electrode selected from the group consisting of the positive electrode and the negative electrode by using the electrolyte for a lithium secondary battery which includes the compound represented by Formula 1.

Specifically, a decomposition product containing boron and sulfur in the film may be included while the compound represented by Formula 1 is decomposed by the decomposition reaction of the electrolyte during charge and discharge of the battery.

For example, the film containing boron and sulfur may be formed on the surface of the positive electrode by an oxidation decomposition reaction or on the surface of the negative electrode by a reduction decomposition reaction.

(3) Separator

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a polyolefin-based porous polymer film coated with inorganic particles (e.g.: $Al_2O_3$) or a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

Example 1

(1) Preparation of Electrolyte for Lithium Secondary Battery

An electrolyte for a lithium secondary battery was prepared by adding 0.5 g of the compound represented by Formula 1A, as an additive, and 2 g of 1,3-propane sultone, as an additional additive, to 97.5 g of an organic solvent (difluoroethylene carbonate (DFEC):fluoroethylene carbonate (FEC):ethyl methyl carbonate (EMC)=1:1:8 volume ratio) in which 1.0 M $LiPF_6$ was dissolved.

(2) Lithium Secondary Battery Preparation

A positive electrode active material ($LiNi_{0.8}Co_{0.1}Mn_{0.1}O_2$; NCM811), carbon black as a conductive agent, and a polyvinylidene fluoride (PVdF) and rubber mixed binder were mixed in a weight ratio of 96.25:1.5:2.25 and then added to N-methyl-2-pyrrolidone (NMP), as a solvent, to prepare a positive electrode active material slurry (solid content: 50 wt %). A 12 μm thick aluminum (Al) thin film, as a positive electrode collector, was coated with the positive electrode active material slurry, dried, and roll-pressed to prepare a positive electrode.

A negative electrode active material (Si:graphite=70:18 weight ratio), carbon black as a conductive agent, and lithium poly(acrylic acid) (LiPAA), as a binder, were mixed in a weight ratio of 88:2:10 and then added to water, as a solvent, to prepare a negative electrode active material slurry (solid content: 60 wt %). A 6 μm thick copper (Cu) thin film, as a negative electrode collector, was coated with the negative electrode active material slurry, dried, and then roll-pressed to prepare a negative electrode.

An electrode assembly was prepared by sequentially stacking the positive electrode, a polyolefin-based porous separator coated with inorganic particles (Al$_2$O$_3$), and the negative electrode. Thereafter, the electrode assembly was accommodated in a pouch-type battery case, and the electrolyte for a lithium secondary battery was injected thereinto to prepare a pouch-type lithium secondary battery.

Example 2

An electrolyte for a lithium secondary battery and a lithium secondary battery were prepared in the same manner as in Example 1 except that 0.7 g of the compound represented by Formula 1A and 2 g of 1,3-propane sultone were added to 97.3 g of the organic solvent when the electrolyte for a lithium secondary battery was prepared.

Example 3

An electrolyte for a lithium secondary battery and a lithium secondary battery were prepared in the same manner as in Example 1 except that 0.8 g of the compound represented by Formula 1A and 2 g of 1,3-propane sultone were added to 97.2 g of the organic solvent when the electrolyte for a lithium secondary battery was prepared.

COMPARATIVE EXAMPLES

Comparative Example 1

An electrolyte for a lithium secondary battery and a lithium secondary battery were prepared in the same manner as in Example 1 except that the compound represented by Formula 1A was not added when the electrolyte for a lithium secondary battery was prepared.

EXPERIMENTAL EXAMPLES

Experimental Example 1: Initial Resistance Evaluation

After each of the lithium secondary batteries prepared in Examples 1 to 3 and Comparative Example 1 was charged at a constant current (CC) of 0.1 C to 4.20 V under a constant current-constant voltage (CC-CV) condition (current cut 0.05 C) to be activated, degassing was performed. Thereafter, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging/discharging were defined as one cycle, and discharge capacity after 3 cycles were performed at 0.33 C within a range of 2.5 V to 4.2 V was set as initial discharge capacity. The initial discharge capacity was measured using PNE-0506 charge/discharge equipment (manufacturer: PNE SOLUTION Co., Ltd., 5 V, 6 A)). Then, a state of charge (SOC) was adjusted to 50%, a pulse at 2.5 C was applied for seconds to calculate initial resistance using a voltage difference before and after the application of the pulse, and the results thereof are presented in FIG. 1. Referring to FIG. 1, it may be confirmed that, since initial resistance values of the lithium secondary batteries of Examples 1 to 3, to which the compound represented by Formula 1A was added, were lower than that of the lithium secondary battery of Comparative Example 1, resistance characteristics were improved.

Experimental Example 2: Initial Discharge Capacity Evaluation

Figure 2:
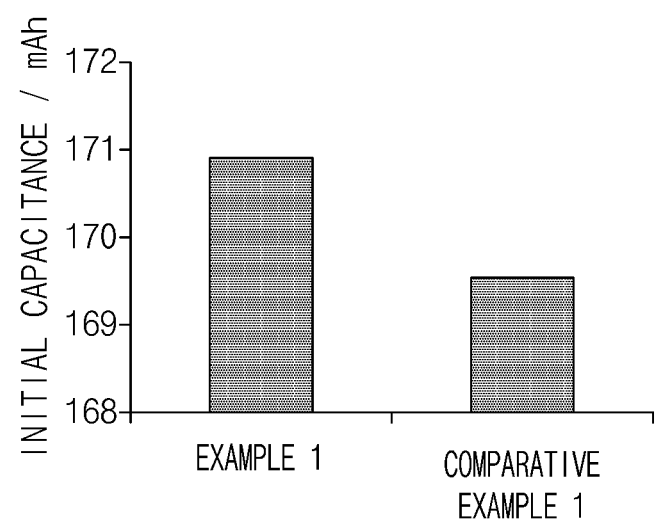
FIG. 2 is a graph illustrating initial capacities measured according to Experimental Example 2.

After each of the lithium secondary batteries prepared in Example 1 and Comparative Example 1 was activated at a CC of 0.1 C, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging/discharging were defined as one cycle, discharge capacity after 3 cycles were performed was defined as initial discharge capacity, and the initial discharge capacity was measured using PNE-0506 charge/discharge equipment (manufacturer: PNE SOLUTION Co., Ltd., 5 V, 6 A)). The initial discharge capacities measured are presented in FIG. 2. Referring to FIG. 2, it may be confirmed that initial discharge capacity of the lithium secondary battery of Example 1 was higher than that of the lithium secondary battery of Comparative Example 1.

Experimental Example 3: Life Characteristics Evaluation

After each of the lithium secondary batteries prepared in Example 1 and Comparative Example 1 was activated at a CC of 0.1 C, degassing was performed.

Subsequently, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging/discharging were defined as one cycle, discharge capacity after 3 cycles were performed was defined as initial discharge capacity, and the initial discharge capacity was measured using PNE-0506 charge/discharge equipment (manufacturer: PNE SOLUTION Co., Ltd., 5 V, 6 A)). Thereafter, a state of charge (SOC) was adjusted to 50%, and a pulse at 2.5 C was then applied for 10 seconds to calculate initial resistance using a voltage difference before and after the application of the pulse.

Next, each lithium secondary battery was charged at a CC of 1.0 C to 4.2 V under a constant current-constant voltage (CC-CV) condition at 45° C., then subjected to 0.05 C current cut-off, and discharged at 0.5 C under a CC condition to 3.0 V. The above charging and discharging were defined as one cycle, 200 cycles of charging and discharging were performed at room temperature (25° C.), and capacity retention (%) was then measured. The capacity retention was calculated using the equation: (discharge capacity after 200 cycles/discharge capacity after 1 cycle)×100. The capacity retentions measured are presented in FIG. 3.

Figure 3:
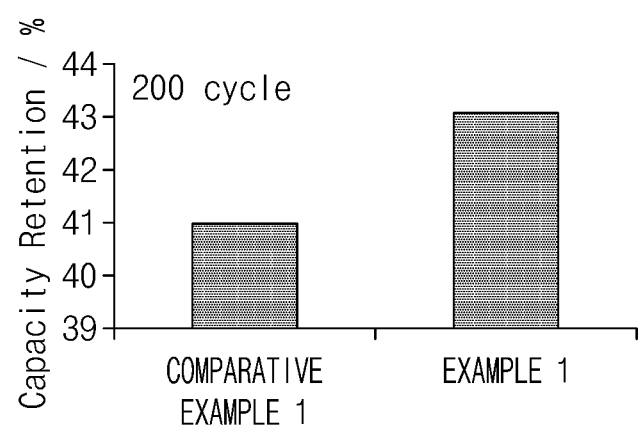
FIG. 3 is a graph illustrating capacity retentions according to the number of cycles which are measured according to Experimental Example 3.

According to FIG. 3, it may be understood that, after 200 cycles of charging and discharging, the lithium secondary battery of Example 1 had a higher capacity retention than the lithium secondary battery of Comparative Example 1, and, referring to these results, it may be confirmed that cycle characteristics of the lithium secondary battery of Example 1 were improved in comparison to those of the lithium secondary battery of Comparative Example 1.

The invention claimed is:

1. An electrolyte for a lithium secondary battery, the electrolyte comprising:
a lithium salt;
an organic solvent; and
an additive,
wherein the additive comprises a compound represented by Formula 1:

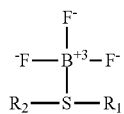

[Formula 1]

wherein, in Formula 1, $R_1$ and $R_2$ are each independently an alkyl group having 1 to 3 carbon atoms.

2. The electrolyte for a lithium secondary battery of claim 1, wherein, in Formula 1, $R_1$ and $R_2$ are each independently selected from the group consisting of —$CH_3$, —$C_2H_5$, —$C_3H_7$, and —$CH(CH_3)_2$.

3. The electrolyte for a lithium secondary battery of claim 1, wherein the compound represented by Formula 1 is selected from the group consisting of compounds represented by Formulae 1A to 1J.

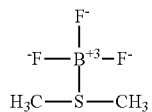

[Formula 1A]

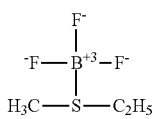

[Formula 1B]

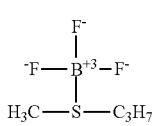

[Formula 1C]

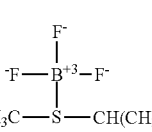

[Formula 1D]

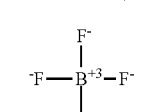

[Formula 1E]

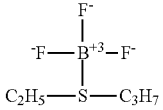

[Formula 1F]

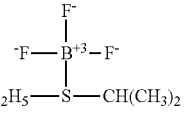

[Formula 1G]

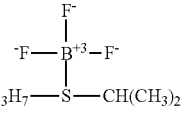

[Formula 1H]

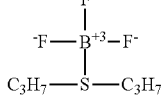

[Formula 1I]

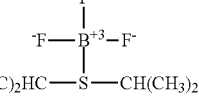

[Formula 1J]

4. The electrolyte for a lithium secondary battery of claim 1, wherein the compound represented by Formula 1 is present in an amount of 0.1 part by weight to 2 parts by weight based on 100 parts by weight of the electrolyte.

5. The electrolyte for a lithium secondary battery of claim 1, wherein the compound represented by Formula 1 is present in an amount of 0.3 part by weight to 2 parts by weight based on 100 parts by weight of the electrolyte.

6. The electrolyte for a lithium secondary battery of claim 1, wherein the compound represented by Formula 1 is present in an amount of 0.3 part by weight to 1 part by weight based on 100 parts by weight of the electrolyte.

7. The electrolyte for a lithium secondary battery of claim 1, wherein the additive further comprises at least one compound selected from the group consisting of a vinyl silane-based compound, a phosphate-based compound, a phosphite-based compound, a sulfite-based compound, a sulfone-based compound, a sulfate-based compound, a sultone-based compound, a halogen-substituted carbonate-based compound, a nitrile-based compound, a borate-based compound, and a lithium salt-based compound.

8. The electrolyte for a lithium secondary battery of claim 1, wherein the additive further comprises at least one compound selected from the group consisting of 1,3-propane sultone, 1,4-butane sultone, ethane sultone, 1,3-propene sultone, 1,4-butene sultone, and 1-methyl-1,3-propene sultone.

9. A lithium secondary battery, comprising:
a positive electrode;
a negative electrode; and
the electrolyte of claim 1.

10. The lithium secondary battery of claim 9, wherein a film containing boron and sulfur is formed on a surface of at least one of the positive electrode or the negative electrode.

* * * * *